United States Patent [19]
Zoltai

[11] 4,193,061
[45] Mar. 11, 1980

[54] ELECTRONIC AUTHENTICATION SYSTEM

[76] Inventor: John T. Zoltai, P.O. Box 5463, Santa Fe, N. Mex. 87502

[21] Appl. No.: 923,749

[22] Filed: Jul. 11, 1978

[51] Int. Cl.² ............................................ H04Q 3/02
[52] U.S. Cl. ...................................... 371/67; 235/382; 340/149 R
[58] Field of Search ................. 340/146.1 C, 146.1 R, 340/146.1 E, 149 R, 149 A; 364/200, 900; 235/380, 382

[56] References Cited
U.S. PATENT DOCUMENTS

| | | | |
|---|---|---|---|
| 3,794,813 | 2/1974 | Spetz | 235/382 |
| 3,846,622 | 11/1974 | Meyer | 235/382 |
| 3,956,615 | 5/1976 | Anderson et al. | 340/149 A |
| 4,016,404 | 4/1977 | Appleton | 235/380 |
| 4,017,835 | 4/1977 | Randolph | 235/380 |
| 4,114,027 | 9/1978 | Slater et al. | 340/149 A |
| 4,142,097 | 2/1979 | Ulch | 340/149 R |

Primary Examiner—Charles E. Atkinson
Attorney, Agent, or Firm—Joseph E. Rusz; William Stepanishen

[57] ABSTRACT

An electronic authentication system utilizing a predetermined random code to simultaneously interrogate the control unit and the remote unit by a comparison of the response of each unit.

7 Claims, 6 Drawing Figures

ELECTRONIC AUTHENTICATION SYSTEM

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to an authentication system, and in particular to an electronic authentication system for verifying the security of a remote transmitting station.

In the prior art there are many situations where it is necessary to verify the information or data passing between terminals that are remotely located from one another. Such is the case where an unattended remote station is controlled by a manned central station that is coupled to it by a communication or hard-wired link. In order to secure the system against unauthorized persons exercising control over the remote station by either gaining access to or tapping into the communications link, it is necessary that the security of the remote station be verified by the main control station. A specific example is the recent development in the banking industry where an unattended remotely located branch station may dispense cash to verified depositors in the form of withdrawals or loans under the control of a main or central bank. In such a system a depositor or customer establishes his identity at the branch station through a credit card verifier or the like and communicates the amount of money desired to the central bank. If his balance or credit is sufficient an attendant at the central bank then transmits a command signal to the branch system which initiates the operation of the cash dispensing mechanism. In a system of this type it is obvious that absolute security is essential, since otherwise a skillful criminal could tap into the communications link, learn the command signal, and rapidly empty each branch station of its cash stock by simply duplicating the signal. The prior art approach to this problem has been either the coding of the command signal and or camouflaging it, such as by mixing or interweaving it with an accompanying data or information signal. One of the drawbacks to this approach is that both the code and the camouflaging pattern are always fixed and invariant, and they therefore may be broken or compromised by repeated monitoring and comparison.

SUMMARY OF THE INVENTION

The present invention utilizes control and remote code units which may be linked by telephone lines, microwave link or the like to verify that a communications transmission is in fact authentic. The control unit verifies line security by testing the remote unit periodically at predetermined or desired rate. The control unit comprises a random process unit, a comparator unit, status and control unit, and a transceiver. The remote unit comprises a random process unit and a transceiver. The random process units include a matrix of gates programmed to provide identical output pulse patterns in response to input signals from the status and control unit. The comparator unit compares the output pulse patterns of the random process units and issues an alarm if they are different. In this manner the system can be used to insure that access to a communications terminal is limited to selected authorized terminals. The random process units are capable of accepting 100,000,000 or more sequential input pulses before utilizing all possible output pulse patterns.

It is one object of the present invention, therefore, to provide an improved electronic authentication system that simultaneously interrogates both the remote and control unit to verify line security.

It is another object of the invention to provide an improved electronic authentication system wherein an internally generated random pattern is applied to both the remote and control units.

It is still another object of the invention to provide an improved electronic authentication system utilizing any one of a number of different audio frequency tones or other means of communications to interrogate the remote and control units of the authentication systems.

It is yet another object of the invention to provide an improved electronic authentication system capable of generating random code patterns containing more than one million bits.

These and other advantages, objects and features of the invention will become more apparent after considering the following description taken in conjunction with the illustrative embodiment in the accompanying drawings.

BRIEF DESCRIPTION OF THE DRAWINGS

Referring now to FIG. 1, there is shown an electronic authentication system comprising a control unit 10 and a remote unit 12 which are linked by cable 14. It may be noted that the remote and control units 10, 12 are virtually identical and differ only in that the control unit 10 has a status and control unit and a comparator unit. In the present example, it may be assumed that the remote and control units, 10, 12 are physically separated from each other but are electrically connected, as shown by hardwire audio lines which may be part of a telephone system, or by radio or microwave link, or by any medium whereby it is possible to accurately exchange audio frequency intelligence. The communications link or line security is verified by the control unit 10 challenging the remote unit 12 at a predetermined rate, such as once a second. The verification process is initiated in the status and control unit 16 wherein a random predetermined code pattern is simultaneously applied to the random process unit 18 and to random process unit 20 by means of transmit module 24, cable 14 and receive unit 26. The random process units 18, 20 respond to the interrogation by transmitting an output signal to the comparator unit 22. The random process unit 20 utilizes transmit unit 28, cable 14 and receive unit 30 to send its output signal response to the comparator unit 22. A typical system uses a pattern 100,000,000 bits long, of which any one of these bits may be selected for use at random. Both random process units 18, 20 receive exactly the same impulses from the status and control unit 16 and are required to respond in exactly the same manner in order to verify the security of the line. The status and control unit 16 sends out, at predetermined intervals, one of a number of challenge words. These words are received and are acted upon by the respective random process units 18, 20 to produce one of ten responses, which are simultaneously returned to the comparator unit 22. The comparator unit 22 determines if the correct responses are present or absent, and informs the status and control unit 16 to act on the data received from the comparator if authenticity is established. Otherwise an alarm signal is applied to the annunciator unit 25 which alerts control unit personnel that line security has been compromised.

The random process units 18, 20 are basically the essential elements of the line security verification system. The random process units take the input pulses from the status and control unit and both produce output pulses in response thereto. The pattern is predetermined from within the units, but is completely random from outside the system, and lacking the pattern key for that particular unit in use, it is extremely difficult to predict. For example, with a seven board random process unit it is possible to sequentially apply 100,000,000 input pulses before all possible patterns have been utilized. Assuming an input pulse every five minutes for the lower risk units, it will take 951.29 years to completely exhaust the units pattern potential. For the higher risk units, apply an input pulse every second, and the RPU would need to have its patterns revised every 3.17 years to avoid pattern repetition.

Figure 2:
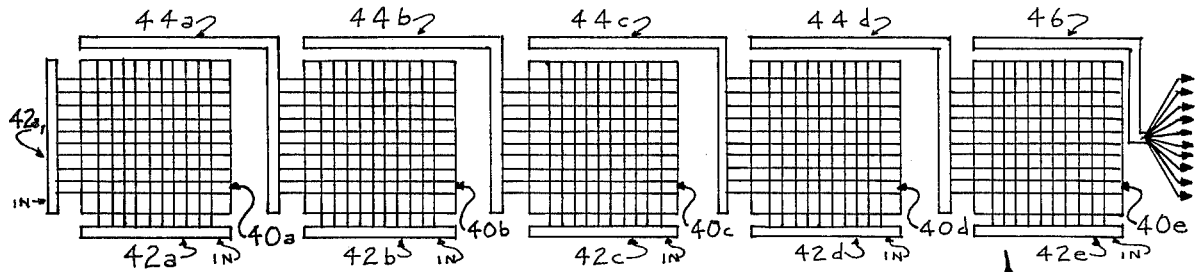
FIG. 2 is a block diagram of the random process unit utilized in FIG. 1.

Turning now to FIG. 2 there is shown a typical random process unit that may be utilized in both the remote and control units. In any given system the remote and the control random process units have an identical circuit and program configuration. For the present example there is shown five random process generator boards 40a–e. The number of random process generator boards may be varied as the situation or application requires. It may be noted that the corresponding boards 40a–e in both the remote and control units, will be programmed internally to provide identical output responses.

The interrogation signal to the random process generator boards 40a–e is applied to driver units 42a–e, wherein the interrogation signal is decoded and applied to the proper input position terminal. The random process board which is the heart of the authentication system is required to provide a random output pattern in response to either a random or sequential input pattern. The circuit boards 40a–3 are shown having either two driver units connected to its respective X and Y axis (circuit board 40a with driver units 42a$_1$, and 42a$_1$ connected to its X-Y axis respectively) or one driver unit on the X axis and the output from a previous board on the Y axis, as shown by the remaining circuit boards 40b–e. The driver units, 42a$_1$, a–e which will be discussed in FIG. 4, comprise a decade counter in series with a binary coded decimal (BCD) to decimal decoder. Cable wiring harnesses 44a–d are utilized to provide identical one to one cable connections between the output position 1 of one board to the input position 1 of a following board, each output position being connected to its corresponding input position on the board following. This cable connection scheme was utilized for the present example, however, it should be noted that the random process code may be made more intricate by utilizing a random pattern wiring configuration. The output cable harness 46 from the last random process generator board 40e provides output connections 1–10. The random process unit shown in FIG. 2 illustrates five circuit boards linked together in a chain in which each preceding output is fed into each succeeding circuit board until the end of the chain is reached. This factor provides the random process unit's flexibility, since any number of boards can be stacked in this way, until the desired pattern length is attained. In system operation, the output from the last circuit board, 40e, is connected to the transmit unit for data transmission to the comparator unit in the control unit.

Figure 1:
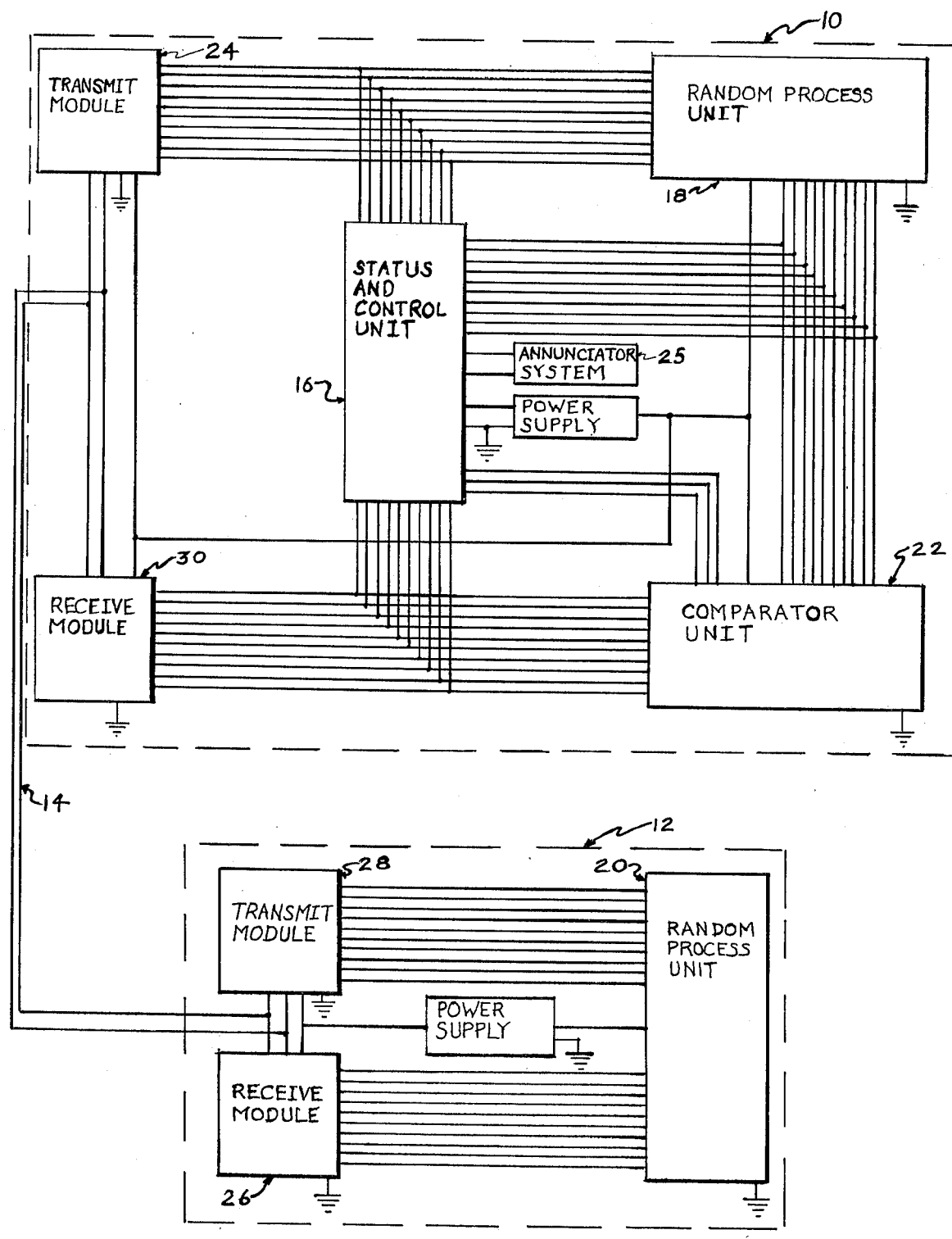
FIG. 1 is a block diagram of the electronic authentication system according to the present invention.
Figure 3:
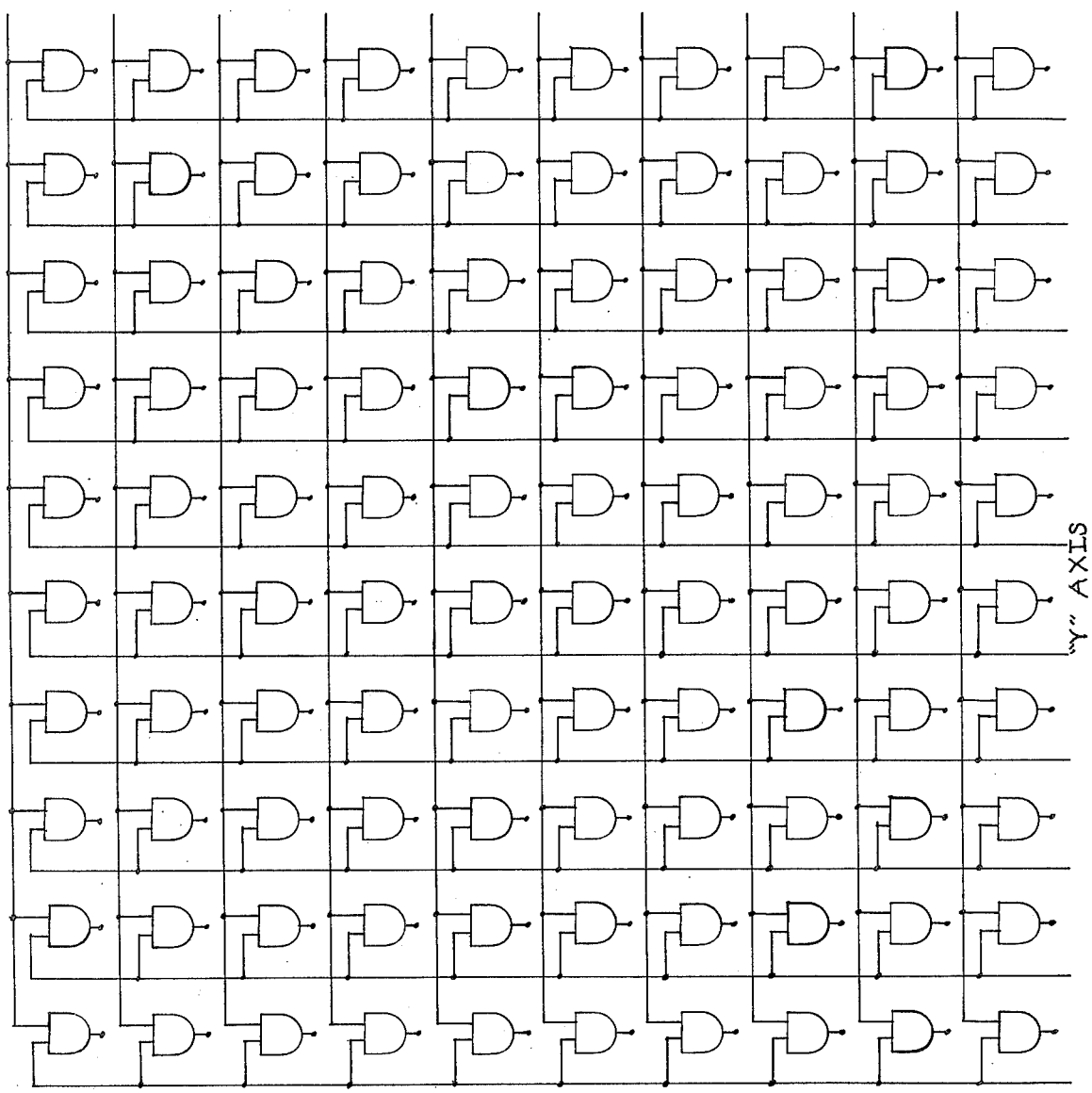
FIG. 3 is a schematic diagram of the random process generator board.

There is shown in FIG. 3 a schematic diagram of one of the random process generator boards shown in FIG. 2. The series of AND gates are arranged to correspond to each of the 100 intersections shown in any of the board shown in FIG. 1. On the X and Y axes of the board are ten inputs. These inputs are either connected to the outputs from a decade counter, or the outputs from a previous board. It may be noted that the AND gates are grouped in rows of ten, both horizontally and vertically. These AND gate circuits may be implemented through the use of integrated circuit packages such as the commercially available Signetics quadruple two-input positive AND gates, S5408/N7408. The horizontal rows, or Y axes, each have connections to one side of ten AND gates, while the vertical rows, or X axes, are each connected to the other side of ten AND gates each. This arrangement is essentially an electronic version of an X-Y axis graph. Normally a designated point on a graph would be identified by two numerals, such as (3,2), meaning X is 3 and Y is 2. On the present electronic graph, an input on line X3 provides a logic high to one input of each of a row of ten AND gates, and Y2 provides a logic high to one input of each of another row of ten AND gates. Where these two rows intersect, one AND gate receives logic highs on both of its inputs, and produces an output. In this manner, one point in a group of one hundred points can be selected. The outputs of the AND gates are connected together in groups of ten to provide a possibility of one of ten possible outputs from a given random process generator board. The AND gate outputs may be either hardwired in any desired output pattern or each AND gate output is assigned a number at random from one to ten and fed into the next board or to the output of the unit.

This random interconnection of AND gate outputs provides the random process units security features. These boards are to be made in pairs, one to be placed in the control unit, and one to be placed in the remote unit. These two boards have exactly the same pattern, and have identical positions in the stack, if there are other boards in the stack, they are arranged in exactly the same order in both units. This permits the use of an intricate pattern which is the same in both units, but different from any other system. This eliminates the possibility of defeat by unit substitution, since an intruder unit would have a completely different pattern, and the remote intruder unit would not respond correctly, and the comparator would trigger an alarm.

Figure 4:
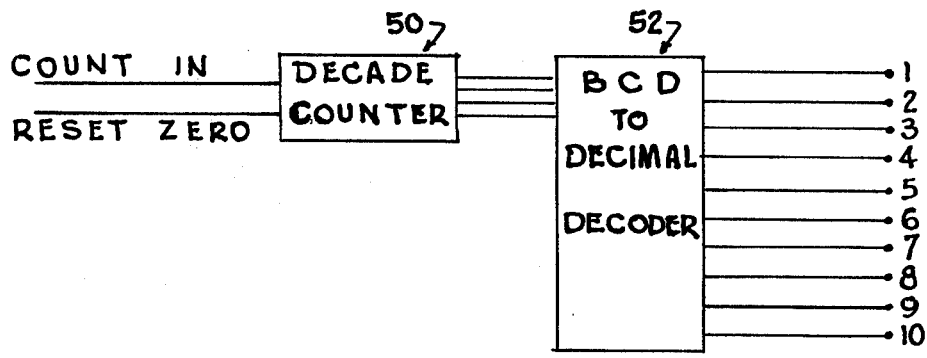
FIG. 4 is a block diagram of the driver unit.

Turning now to FIG. 4, there is shown a block diagram of the driver unit, shown in FIG. 2, that activates the random process generator boards shown generally in FIG. 2 and in greater detail in FIG. 3. The decade counter 50 receives one or a series of pulses at its input that will cause it to count once for each pulse received and continuing the sequence from 1 to 10 and recycling. It is also resettable to 0 via a separate input pulse. This counter 50 produces a binary output, which is fed into a BCD to decimal decoder unit 52, which produces an output on one of ten lines. The output from the BCD to decimal decoder unit 52 is fed into a random process generator board as described with respect to FIG. 1. The driver unit may be implemented by integrated circuits which are commercially available from Signetics; for example, the Signetics S5490/N7490 may be utilized as the decade counter while the Signetics S5442/N7442 may be utilized as the BCD to decimal decoder unit.

Figure 5:
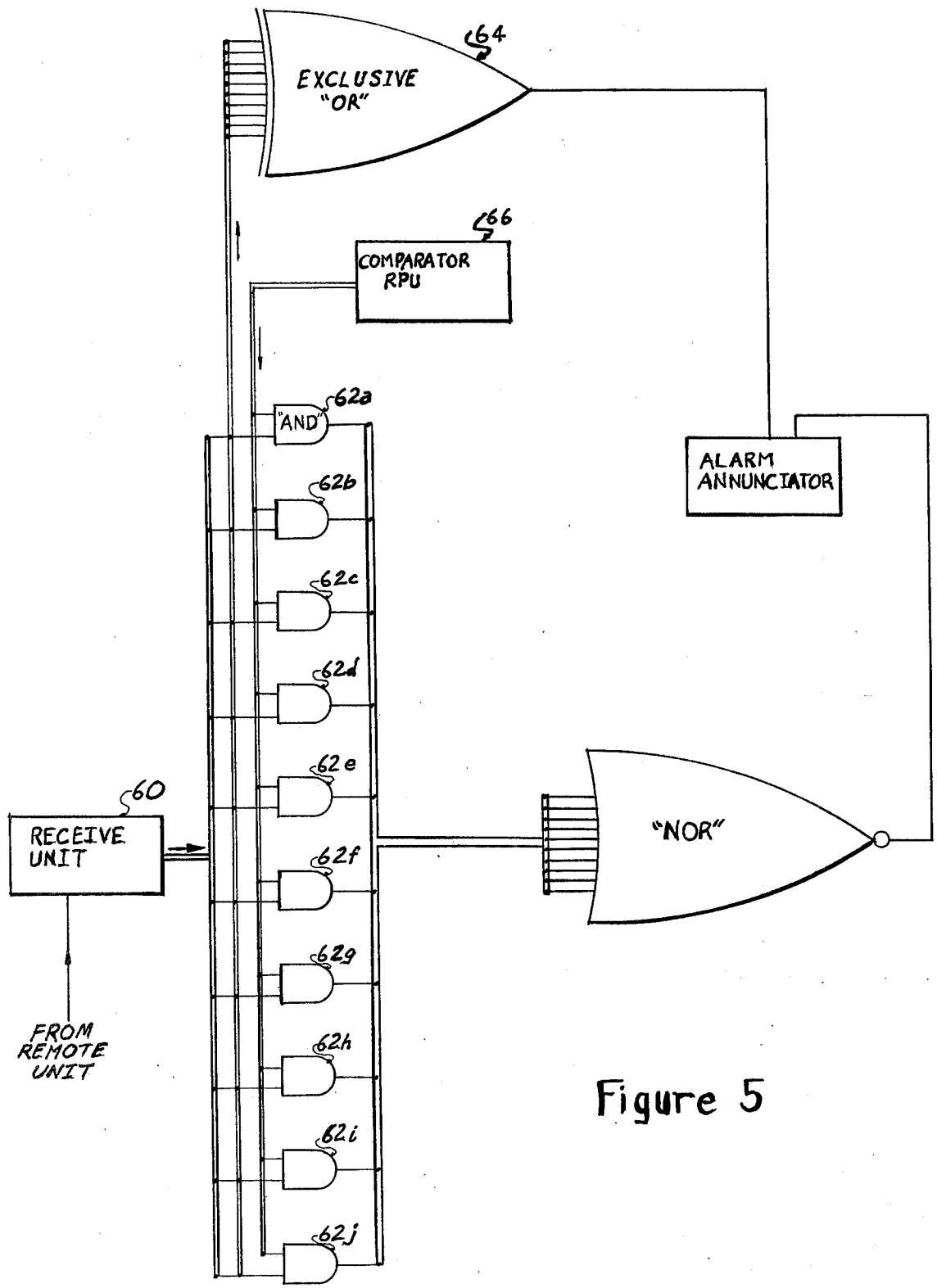
FIG. 5 is the logic schematic diagram for the comparator unit, and, FIG. 6 is the schematic diagram for the status and control unit.

There is shown in FIG. 5 the logic diagram for the comparator unit which compares the response output signals from the random process unit in the remote unit and the random process unit in the control unit. Since the random process units both have identical patterns, and are triggered at the same time, thus, the two returning signals to the comparator should be the same.

The signal from the remote unit enters the receive unit where it is filtered. The filtered signal is applied by one of ten lines to a bank of ten AND gates 62a-j and also to a ten input exclusive OR gate 64. The signal from the comparators internal random process unit 66 is also sent to the bank of ten AND gates 62a-j. The AND gate bank receives two signals, and as long as the two signals correspond to the same count, one AND gate is fired, and this signal is sent to a ten input NOR gate 68. This NOR gate 68 will only provide an output to the alarm relays if no input is received. The lack of an input may be caused by an erroneous signal from the remote unit, a lack of a signal from the remote unit, or the remote unit purposely sending an erroneous signal due to an alarm condition at the risk location. The ten input exclusive OR gate 64 is designed to provide an alarm to the alarm annunciators 70 if none, or more than one signal is received, such as may occur when a hostile agent is attempting to send the most probable signals down the line in an attempt to defeat the system.

Figure 6:
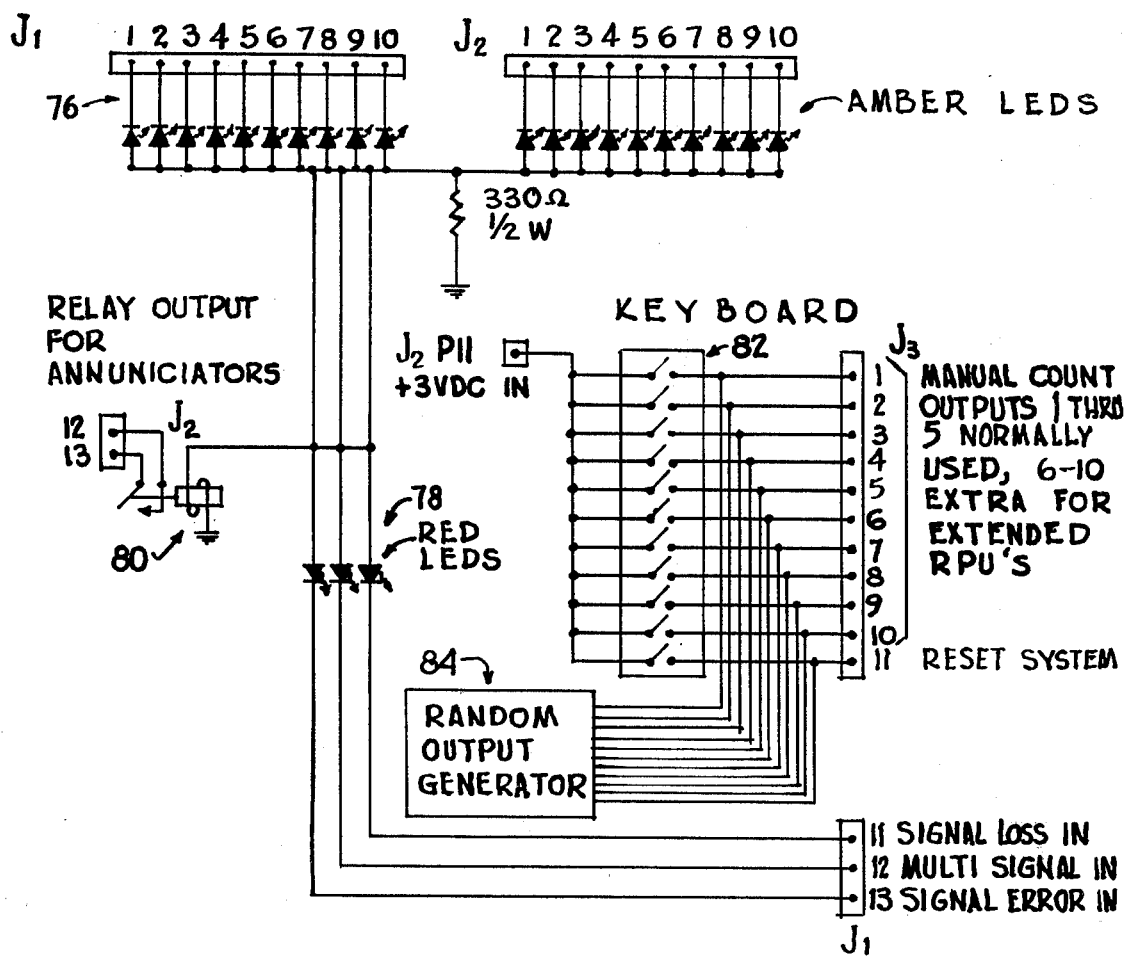

Referring now to FIG. 6, there is shown the schematic diagram for the status and control unit wherein the amber light emitting diodes 76 display the control and remote random process unit's outputs to provide visual verification of pattern match, thus backing up the comparator with a human brain, and for assistance in troubleshooting. The three red LED's 78 indicate the nature of the pattern match failure which may be signal error, signal loss, or multiple signals. Illumination of these lamps causes a relay 80 to operate and activate the alarm annunciator. The keyboard 82 permits the manual operation of resetting and selectively triggering of the counters in both random process units. The random output generator 84 normally provides the trigger pulses for the random process units in both the remote and control units. It may be noted that a random output generator may be easily constructed from readily available kits such as the "Goofy Lite" Science Fair marketed by Radio Shack, and the "Kreskins' ESP Tester" is available through Edmund Scientific Co. For manual authentication the random output generator 84 must be turned off and the reset key (connected to pin 11 of connector J3) must be pressed to set all the counters back to zero. Pressing one key of calculator keyboard 82 causes one counter in the random process unit chain to count once.

The only requirements for the transmit-receive units of the remote and control units is that these units be capable of distinguishing and transmitting digital words, tones or the like. Further, regulated power supplies for TTL logic voltages, such as +12 and +5 VDC are well known and readily available.

Although the invention has been described with reference to a particular embodiment, it will be understood to those skilled in the art that the invention is capable of a variety of alternative embodiments within the spirit and scope of the appended claims.

What is claimed is:

1. An electronic authentication system comprising in combination:

a remote unit comprising:
 a random process unit to receive a random input pattern, said random process unit having a predetermined program configuration, said random process unit having a plurality of random process boards, each having a random output configuration respectively, said random process unit decoding said random input pattern to provide a remote random output pattern, said remote random output pattern varying in response to said random input pattern, and
 a transmit/receive unit connected to said random process unit to transfer said random input pattern to said random process unit and to transmit said remote random output pattern from said random process unit; and a control unit comprising:
 a status/control means for generating a continuously varying random input pattern, said random input pattern containing a predetermined number of impulses and occurring at a predetermined interval, said random input pattern having a predetermined pattern length, said predetermined pattern length being variable,
 a control random process unit connected to said status/control means to receive said random input pattern, said control random process unit having a predetermined wiring configuration, said random process unit having a plurality of random process boards, each having a random output configuration respectively, said random process unit decoding said random input pattern to provide a control random output pattern, said control random output pattern varying in response to said random input pattern,
 a control transmit/receive unit connected to said status/control means and said control random process unit, said control transmit/receive unit being connected to said remote transmit/receive unit to transmit said random input pattern to said remote unit and to receive said remote random output pattern therefrom, and,
 a comparator means connected to said control random process unit, said status/control means and said control transmit/receive unit, said comparator means receiving and comparing said control random output pattern and said remote random output pattern to provide a control signal to said status/control means, said comparator generating said control signal whenever a mismatch or error occurs in received random output patterns, said control signal activating said status/control means to generate an alarm.

2. An electronic authentication system as described in claim 1 wherein said plurality of random process boards in both said remote and control units comprises multiple boards of which each board differs in configuration from each other, random process boards in the same location in the remote and control units having an identical program configuration.

3. An electronic authentication system as described in claim 1 each of said plurality of random process boards in said remote and control units comprise a ten by ten matrix array of AND gates wherein one input of each AND gate is connected to an X-axis input terminal and the other input of each AND gate is connected to the X-axis input terminal, the output of each AND gate is randomly connected in groups of ten to one of a group of ten output terminals.

4. An electronic authentication system as described in claim 1 wherein said status/control means utilizes a random output generator to continuously generate said random input pattern.

5. An electronic authentication system as described in claim 1 wherein said status/control means utilizes a keyboard to manually select and provide said random input pattern.

6. An electronic authentication system as described in claim 1 wherein said status/control means includes a visual display means for pattern match verification.

7. An electronic authentication system as described in claim 1 wherein said comparator means comprises in combination:
- a ten-input exclusive OR gate to receive said remote random process pattern and provide a response thereto, and,
- ten two-input AND gates each having one input connected to receive said control random process output pattern and the other input of said AND gate connected to receive said remote random process output pattern, and
- a ten-input NOR gate connected to receive each output from said ten two-input AND gates, said NOR gate providing an output when a mismatch occurs.

* * * * *